United States Patent [19]

Stephen

[11] 3,821,161
[45] June 28, 1974

[54] AROMATIC DIIMIDES OF 3,5-DIALKYL-4-HYDROXYPHENYLSUB-STITUTED AMINES
[75] Inventor: John F. Stephen, New City, N.Y.
[73] Assignee: Ciba-Geigy Corporation, Ardsley, N.Y.
[22] Filed: Jan. 18, 1973
[21] Appl. No.: 324,629

Related U.S. Application Data
[62] Division of Ser. No. 186,463, Oct. 4, 1971, Pat. No. 3,746,721.

[52] U.S. Cl. ..................... 260/45.8 N, 260/45.85 S
[51] Int. Cl. ............................................. C08f 45/58
[58] Field of Search ................. 260/45.8 N, 45.85 S

[56] References Cited
UNITED STATES PATENTS
3,734,926   5/1973   Dexter .......................... 260/45.8 N
3,746,721   7/1973   Stephen ........................ 260/45.8 N Primary Examiner—Melvyn I. Marquis

[57] ABSTRACT

Aromatic diimides of 3,5-dialkyl-4-hydroxyphenylsubstituted amines of this invention effectively stabilize organic polymeric materials against the effects of heat and oxygen. The diimides of this invention are prepared by reacting the appropriate 3,5-dialkyl-4-hydroxyphenylsubstituted amine with an aromatic dianhydride or aromatic diimide. An example of this class of stabilizer is N,N'-bis(3,5-di-t-butyl-4-hydroxybenzyl)diphenyl sulfone-3,4,3',4'-tetracarboxylic acid diimide.

7 Claims, No Drawings

AROMATIC DIIMIDES OF 3,5-DIALKYL-4-HYDROXYPHENYLSUBSTITUTED AMINES

This application is a divisional application of U.S. application Ser. No. 186,463, filed on Oct. 4, 1971, now U.S. Pat. No. 3,746,721.

DETAILED DESCRIPTION

This invention relates to novel aromatic diimide derivatives of 3,5-dialkyl-4-hydroxyphenylsubstituted amines which are useful as stabilizers for organic polymeric materials which are subject to thermal and oxidative deterioration. The compounds of this invention are represented bh the formula:

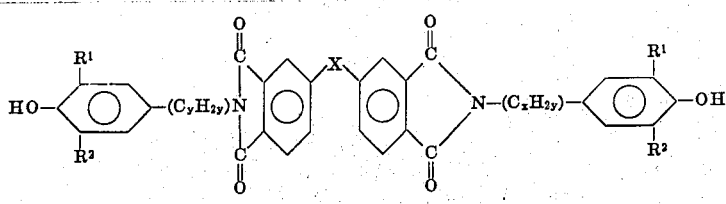

wherein each of $R^1$ and $R^2$ is the same or different (lower) alkyl group of from one to four carbon atoms; X is selected from the group consisting of O, $SO_2$, and alkylene of from one to three carbon atoms; and y has a value of from 0 to 3.

Illustrative examples of (lower) alkyl groups of from one to four carbon atoms which are represented by $R^1$ and $R^2$ are methyl, ethyl, propyl, isopropyl, butyl and t-butyl. The preferred groups are methyl, isopropyl, and the tertiary alkyl, t-butyl.

The compounds of the formula wherein y is 0, 2 and 3, can be prepared by reacting a 3,5-dialkyl-4-hydroxyphenylsubstituted amine of the formula:

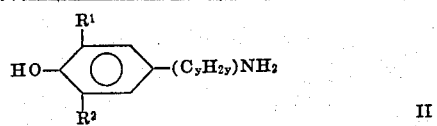

wherein $R^1$ and $R^2$ are as defined previously, with an aromatic dianhydride of the formula:

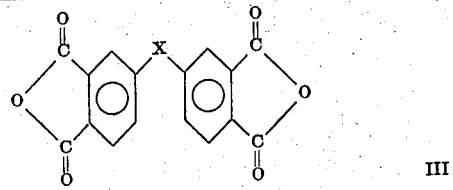

wherein X is as defined above, in an insert solvent such as dichlorobenzene at reflux temperatures.

The compounds of formula 1 wherein y is 1 can be prepared by reacting 3,5-dialkyl-4-hydroxybenzyl dialkylsubstituted amine of the formula:

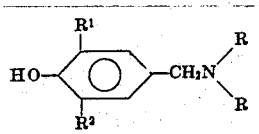

wherein $R^1$ and $R^2$ are as defined previously and R is alkyl such as methyl or ethyl with an aromatic diimide of the formula:

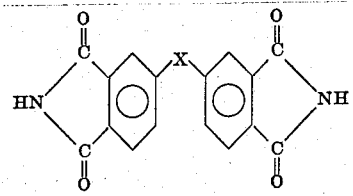

wherein X is as defined above, in an inert solvent such as dimethyl formamide at approximately 120°C.

The 3,5-dialkyl-4-hydroxyphenylsubstituted amines wherein y is 0 can be prepared as described in U.S. Pat. No. 3,198,797. The amine, when y is 2 can be prepared, for example, through chloromethylation of a dialkylphenol as described in U.S. Pat. No. 2,838,571, followed by treatment with sodium or potassium cyanide and reduction of the resultant dialkylhydroxyphenyl acetonitrile to the amine. The amine wherein y is 3 can be prepared by reducing 3,5-dialkyl-4-hydroxyphenylpropionitrile with lithium aluminum hydride to yield the corresponding amine. The nitrile can be prepared according to the method described in U.S. Pat. No. 3,121,732 wherein the appropriate dialkylphenol is reacted with acrylonitrile. The 3,5-dialkyl-4-hydroxybenzyl dialkyl amine of formula IV can be prepared as described by E. P. Previc, et al., Industrial and Engineering Chemistry, Vol. 53, No. 6, Page 469, June 1961.

The intermediate aromatic dianhydrides and diimides can be prepared as follows:

a. The diphenyl ether-3,4,3',4',-tetracarboxylic acid dianhydride is prepared by first preparing the corresponding tetracarboxylic acid as described by Marvel and Rassweiler, J. AM. CHEM. SOC., 80, 1196(1958), followed by treatment of the tetra acid with acetic anhydride. The diphenyl ether-3,4,3',4',-tetracarboxylic acid diimide is prepared by decomposing the tetraammonium salt of diphenyl ether-3,4,3', 4'-tetracarboxylic acid at 250° – 280°C as described by Marvel and Martin, J. AM. CHEM. SOC., 80, 6600(1958) and in U.S. Pat. No. 3,275,651.

b. The diphenyl sulfone-3,4,3',4'-tetracarboxylic acid dianhydride is prepared by first preparing the corresponding tetracarboxylic acid from the nitric acid oxidation of bis(3,4-dimethylphenyl) sulfone as described in U.S. Pat. No. 3,022,320 followed by treatment with acetic anhydride. The diphenyl sulfone 3,4,3', 4'-tetracarboxylic acid diimide can be prepared from the pyrolysis of the tetraammonium salt of the corresponding tetracarboxylic acid following the procedure as outlined by Marvel and Martin J. AM. CHEM. SOC., 80, 6600(1958).

c. The diphenyl methane-3,4,3',4'-tetracarboxylic acid dianhydride is prepared by first preparing diphenyl methane-3,4,3',4',-tetracarboxylic acid by the catalytic reduction of 3,4,3',4'-tetracarbomethoxybenzophenone to the corresponding diphenyl methane ester followed by hydrolysis to the desired tetra acid as described in U.S. Pat. No. 3,332,964. This is followed by treatment of the corresponding tetra acid with acetic anhydride. The diphenyl methane-3,4,3',4'-tetracarboxylic acid diimide is prepared by decomposing the tetraammonium salt of the corresponding tetraacid as described in U.S. Pat. No. 3,275,651.

d. The 4,4'-isopropylidene diphthalic acid dianhydride is prepared from the corresponding tetraacid by the oxidation of 2,2-bis(3,4-dimethylphenyl)propane by the method described in U.S. Pat. No. 2,712,543. The tetraacid is converted to the corresponding dianhydride as described in U.S. Pat. No. 2,712,543. The 4,4'-isopropylidene diphthalic acid diimide can be prepared according to the method used to prepare the corresponding diphenyl methane derivative namely, U.S. Pat. No. 3,275,651.

The compounds of this invention are stabilizers of organic polymeric material normally subject to thermal and oxidative deterioration. Materials which are thus stabilized include synthetic organic polymeric substances such as vinyl resins formed from the polymerization of vinyl halides or from the copolymerization of vinyl halides with unsaturated polymerizable compounds, e.g., vinylesters, α,β-unsaturated ketones, α,β-unsaturated aldehydes, and unsaturated hydrocarbons such as butadienes and styrene; poly-α-olefins such as polyethylene, polypropylene, polybutylene, and the like, including copolymers of poly-α-olefins; polyurethanes and polyamides such as polyhexamethylene adipamide and polycaprolactam; polyesters such as polyethylene terephthalates; polycarbonates; polyacetals; polystyrene; polyethyleneoxide; polyisoprene, polybutadene; and copolymers such as those of high impact polystyrene containing copolymers of butadiene and styrene and those formed by the copolymerization of acrylonitrile, butadiene and/or styrene.

In general, one or more of the stabilizers of the present invention are employed in amounts, in toto, of from about 0.005 to about 5 percent by weight of the composition to be stabilized. A particularly advantageous range of the present stabilizers is from about 0.05 percent to about 2 percent. The preferred range is particularly effective in polyolefins such as polypropylene and polyethylene.

These compounds may be incorporated in the polymer substance during the usual processing operations, for example, by hot-milling, the composition then being extruded, pressed, roll-molded or the like into films, fibers, filaments, hollowspheres and the like. The heat stabilizing properties of these compounds advantageously stabilize the polymer against degradation during such processing at the high temperatures generally encountered.

The stabilizers employed in this invention can also be used in combination with other stabilizers or additives. Especially useful co-stabilizers are dilauryl-β-thiodipropionate and distearyl-β-thiodipropionate.

The following formula represents co-stabilizers which are in certain instances very useful in combination with the stabilizers of this invention:

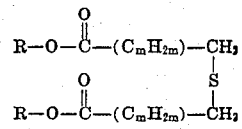

wherein R is an alkyl group having from six to 24 carbon atoms; and $m$ is an integer from 1 to 6. The above co-stabilizers are used in the amount of from 0.01 to 2 percent by weight of the organic material, and preferably from 0.1 to 1 percent.

Other antioxidants, antiozonants, thermal stabilizers, ultraviolet light absorbers, coloring materials, dyes, pigments, metal chelating agents, etc., may also be used in the compositions in combination with the stabilizers of the invention.

The following are presented to further illustrate the present invention without introducing any limitation thereto.

EXAMPLE 1

N,N'-bis(3,5-di-tert-butyl-4-hydroxybenzyl) diphenylether-3,4,3',4'-tetracarboxylic acid diimide In a nitrogen atmosphere, a stirred mixture of 4,4'-diphenylether-3,4,3',4'-tetracarboxylic acid diimide 9.5 g and 2,6-di-tert-butyl-4-dimethylaminomethylphenol 17.9 g in 150 ml of dimethylformamide was heated at 120° for 23 hours. The mixture was poured into water and the solid which separated was extracted with ether. The ether extract was washed with dilute hydrochloric acid and then water. The dried (MgSO$_4$) ether solution was evaporated under reduced pressure to give 25 g of a yellow solid. Recrystallization from 75 ml of methanol followed by a second recrystallization from ethanol-benzene mixture gave material, melting point 187°–189°.

Analysis for $C_{46}H_{52}N_2O_7$:
% Calculated: C, 74.17; H, 7.04; N, 3.76
% Found: C, 74.09; H, 7.25; N, 3.72

EXAMPLE 2

By essentially following the procedure of Example 1, but substituting for the diphenylether tetracarboxylic acid diimide the following aromatic diimides:

a. diphenylsulfone-3,4,3',4'-tetracarboxylic acid diimide b. diphenylmethane-3,4,3',3'-tetracarboxylic acid diimide c. 4,4'-isopropylidene diphthalic acid diimide There is respectively obtained:

a. N,N-bis(3,5-di-t-butyl-4-hydroxybenzyl) diphenylsulfone-3,4,3',4'-tetracarboxylic acid diimide b. N,N'-bis(3,5-di-t-butyl-4-hydroxybenzyl) diphenylmethane-3,4,3',4'-tetracarboxylic acid diimide c. N,N'-bis(3,5-di-t-butyl-4-hydroxybenzyl)-4,4'-isopropylidene diphthalic acid diimide

EXAMPLE 3

N,N'-Bis(3,5-di-t-butyl-4-hydroxyphenyl) diphenylsulfone-3,4,3',4'-tetracarboxylic acid diimide a. The reaction flask is charged with 11.05 g (0.05 moles) of 4-amino-2,6-di-t-butylphenol, 8.0 g (0.025 mole) of diphenylsulfone-3,4,3',4'-tetracarboxylic acid dianhydride and 100 ml of o-dichlorobenzene. The reaction mixture is heated to reflux for until the imidization is completed. After cooling, the mixture is filtered and washed with petroleum ether. The filtrate is dried and recrystallized from aqueous acetone, and dried.

b. By substituting an equivalent amount of 2-(3,5-di-t-butyl-4-hydroxyphenyl)ethylamine for 3,5-di-t-butyl-4-hydroxyphenylamine in the above procedure, the corresponding N,N'-bis[2-(3,5-di-t-butyl-4-hydroxyphenyl)ethyl]diphenylsulfone-3,4,3',4'-tetracarboxylic diimide is obtained.

c. In a similar manner, by substituting an equivalent amount of 3-(3,5-di-t-butyl-4-hydroxyphenyl)propylamine for 3,5-di-t-butyl-4-hydroxyphenylamine in the above procedure, the corresponding N,N'-bis[3-(3,5-di-t-butyl-4-hydroxyphenyl)propyl]diphenylsulfone-3,4,3',4'-tetracarboxylic acid diimide is obtained.

EXAMPLE 4

By essentially following the procedure of Example 3 and substituting for the diphenylsulfone-3,4,3',4'-tetracarboxylic acid dianhydride in parts (a), (b) and (c) an equivalent amount of the following dianhydrides:

1. diphenylmethane-3,4,3',4'-tetracarboxylic acid dianhydride
2. diphenylether-3,4,3', 4'-tetracarboxylic acid dianhydride there is obtained the following diimides:

1.
 a. N,N'-bis(3,5-di-t-butyl-4-hydroxyphenyl) diphenylmethane-3,4,3',4'-tetracarboxylic acid diimide
 b. N,N'-bis[2-(3,5-di-t-butyl-4-hydroxyphenyl)ethyl] diphenylmethane-3,4,3',4'-tetracarboxylic acid diimide
 c. N,N'-bis[3-(3,5-di-t-butyl-4-hydroxyphenyl)propyl] diphenylmethane-3,4,3',4'-tetracarboxylic acid diimide 2.
 a. N,N'-bis(3,5-di-t-butyl-4-hydroxyphenyl) diphenylether-3,4,3',4'-tetracarboxylic acid diimide
 b. N,N'-bis[2-(3,5-di-t-butyl-4-hydroxyphenyl)ethyl] diphenylether-3,4,3',4'-tetracarboxylic acid diimide
 c. N,N'-bis[3-(3,5-di-t-butyl-4-hydroxyphenyl)propyl] diphenylether-3,4,3',4'-tetracarboxylic acid diimide

EXAMPLE 5

Unstabilized polypropylene powder (Hercules Profax 6501) is thoroughly blended with 0.2 percent by weight of N,N'-bis(3,5-di-t-butyl-hydroxybenzyl)diphenylsulfone-3,4,3',4'-tetracarboxylic diimide.

Also prepared are samples of polypropylene containing 0.1 percent by weight of the same stabilizer and 0.3 percent by weight of distearylthiodipropionate (DSTDP). The blended materials are milled on a two-roll mill at 182°C for 10 minutes, after which time the stabilized polypropylene is sheeted from the mill and allowed to cool.

The milled polypropylene sheets are cut into pieces and pressed for 7 minutes on a hydraulic press at 218°C, 500 pounds per square inch pressure. The resulting sheets of 25 mil thickness are tested for resistance to accelerated aging in a forced draft oven at 150°C for 100 hours.

The stabilized polypropylene has better color retention, physical integrity and less weight loss after oven aging than polypropylene which is unstabilized.

Stabilized polypropylene compositions are also obtained when 0.5 percent of N,N'-bis(3,5-di-t-butyl-4-hydroxyphenylpropyl)diphenylmethane-3,4,3',4'-tetracarboxylic acid diimide and N,N'-bis(3-methyl-5-t-butyl-4-hydroxybenzyl)diphenylsulfone-3,4,3',4'-tetracarboxylic acid diimide respectively are employed alone or in combination with DSTDP.

EXAMPLE 6

To 39.3 g (0.15 moles) of hexamethylene diammonium adipate is added 0.177 g (7.5 × 10$^{-4}$ mole; 0.5 mole percent) of hexamethylene diammonium diacetate as molecular weight control agent, and 0.183 g (0.5 percent of theoretical nylon yield) of N,N'-bis[2-(3,5-di-t-butyl-4-hydroxyphenyl)ethyl]diphenylsulfone-3,4,3',4'-tetracarboxylic acid diimide. The mixture is blended thoroughly and added to a Pyrex polymer tube.

The polymer is evacuated three times and each time filled with high purity nitrogen. The polymer tube with the continuously maintained, slightly positive nitrogen pressure, is placed in a methyl salicylate vapor bath at 220° C. After one hour at 220°C the polymer tube is transferred to an o-phenyl-phenol bath at 285° C for one hour. The polymer tube is kept in the 285° C vapor bath for an additional one-half hour while it is maintained under vacuum of less than 1 mm pressure. High purity nitrogen is then readmitted and the polymer tube is allowed to cool.

The nylon-6,6 obtained is ground in a mill at ambient temperature of 25°C. About 2 g are heated in a small glass Petri dish in a circulating air-rotary oven at 140°C for 65 hours. The viscosity of a 1 percent sulfuric acid solution of aged and unaged polymer samples are determined at 25°C. Stabilizer effectiveness is judged by the percent retention of specific viscosity, color-formation, and weight retention after oven aging. The stabilized polyamide has better viscosity, color retention and substantially less weight loss after oven aging than a polyamide which is unstabilized.

Stabilized polyamide compositions are prepared in a similar manner as above with the following stabilizers:

a. 0.5 percent of N,N'-bis(3,5-di-t-butyl-4-hydroxybenzyl)diphenylether-3,4,3',4'-tetracarboxylic acid diimide
b. 0.5 percent of N,N'-bis(3-methyl-5-t-butyl-4-hydroxybenzyl)diphenylsulfone-3,4,3',4'-tetracarboxylic acid diimide
c. 0.5 percent of N,N'-bis[2-(3,5-di-t-butyl-4-hydroxyphenyl)ethyl]diphenylsulfone-3,4,3',4'-tetracarboxylic acid diimide
d. 0.5 percent of N,N'-bis[3-(3,5-di-t-butyl-4-hydroxyphenyl)propyl]diphenylmethane-3,4,3',4'-tetracarboxylic acid diimide Substantially similar results are obtained when 0.5 percent of the aforementioned stabilizers are incorporated into nylon-6,6 flakes before extrusion.

EXAMPLE 7

A quantity of SBR emulsion containing 100 g of rubber (500 ml of cold SBR type 1500) previously stored under nitrogen, is placed in a beaker and stirred vigorously. The pH of the emulsion is adjusted to 10.5 with a 0.5N NaOH solution.

To the emulsion is added 50 ml of 25 percent NaCl solution. A 6 percent NaCl solution which has been acidified with HCl to a pH 1.5 is added in a thin stream with vigorous stirring. When pH 6.5 is reached, the rubber begins to coagulate and the addition is slowed down in order to maintain uniform agitation. The addition of the acidic 6 percent NaCl solution is terminated when a pH 3.5 is reached. The coagulated crumbrubber slurry at pH 3.5 is stirred for one-half hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (<1 mm.) at 40°–45°C.

The dried rubber (25 g) is heated under nitrogen at 125° in a Brabender mixer and to this is added with mixing 0.125 g (0.5 percent) of N,N'-bis(3,5-di-t-butyl-4-hydroxybenzyl)diphenylsulfone-3,4,3',4'-tetracarboxylic acid diimide. The composition is mixed for 5 minutes after which it is cooled and compression molded at 125°C into 5 inches × 5 inches × 0.025 inch plaques.

The plaques are placed on aluminum sheets and heated in a circulating air oven at 100°C for up to 96 hours. The viscosity of a 0.5 percent toluene solution of aged and unaged rubber samples are determined at 25°C. Stabilizer effectiveness is judged by the percent retention of specific viscosity, color formation and gel content after oven aging. The stabilized rubber has better viscosity, color retention and less gel content than the rubber which is unstabilized after oven aging.

Similar results are obtained with N,N'-bis(3,5-di-t-butyl-4-hydroxybenzyl)diphenylmethane-3,4,3',4'-tetracarboxylic acid diimide N,N'-bis[3,5-di-t-butyl-4-hydroxyphenyl)propyl]diphenylether-3,4,3',4'-tetracarboxylic acid diimide are used in place of the above mentioned stabilizer in the rubber composition.

EXAMPLE 8

A composition is prepared comprising linear polyethylene and 1.0 percent by weight of N,N'-bis(3,5-di-t-butyl-4-hydroxybenzyl)-4,4'-isopropylidine diphthalic acid diimide. This composition resists discoloration at 120°C longer than one which does not contain the stabilizer.

What is claimed is:

1. A composition of matter stabilized against oxidative deterioration which comprises an organic polymeric material normally subject to oxidative deterioration containing from 0.005 to 5 percent by weight of a stabilizing compound of the formula

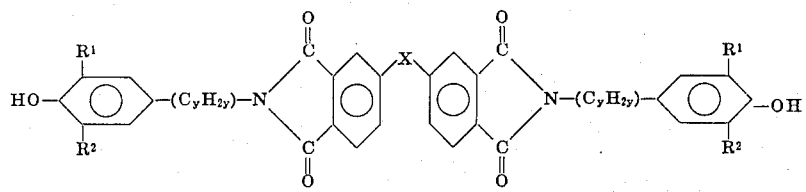

wherein each of $R^1$ and $R^2$ is the same or different lower alkyl group of from one to four carbon atoms;

X is selected from the group consisting of O, $SO_2$, and alkylene of from one to three carbon atoms; and y has a value of from 0 to 3.

2. The composition of claim 1 wherein $R^1$ and $R^2$ is tertiary butyl or methyl.

3. The composition of claim 2 wherein the stabilizing compound is N,N'-bis-(3,5-di-t-butyl-4-hydroxybenzyl)4,4'-isopropylidene diphthalic acid diimide.

4. The composition of claim 2 wherein the stabilizing compound is N,N'-bis-(3,5-di-t-butyl-4-hydroxybenzyl)diphenylsulfone-3,4,3',4'-tetracarboxylic acid diimide.

5. The composition of claim 2 wherein the stabilizing compound is N,N'-bis-(3,5-di-t-butyl-4-hydroxybenzyl)diphenylether-3,4,3',4'-tetracarboxylic acid diimide.

6. The composition of claim 2 wherein the stabilizing compound is N,N'-bis(3,5-di-t-butyl-4-hydroxybenzyl)diphenylmethane-3,4,3',4'-tetracarboxylic acid diimide.

7. The composition of claim 2 wherein the stabilizing compound is N,N'-bis(3-methyl-5-t-butyl-4-hydroxybenzyl)diphenylether 3,4,3',4'-tetracarboxylic acid diimide.

* * * * *